July 12, 1955
M. M. WILEY
2,712,877
AUTOMATICALLY COUPLING WRECKING
TRUCK TOWING ATTACHMENT
Filed April 30, 1952
3 Sheets-Sheet 1
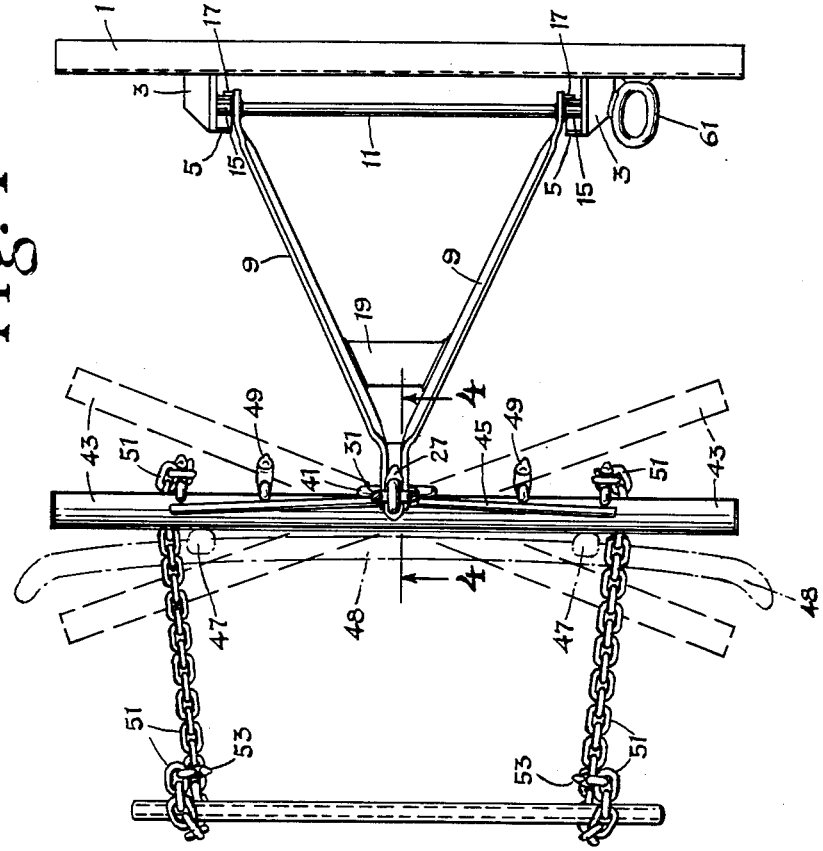
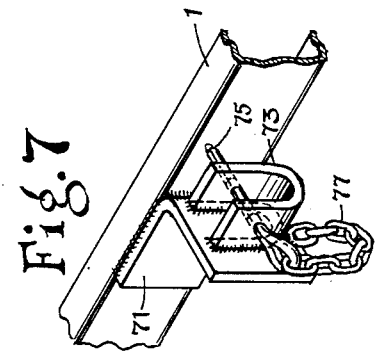
INVENTOR:
Mike M. Wiley
BY
Ralph F. Stauby
ATTORNEY.

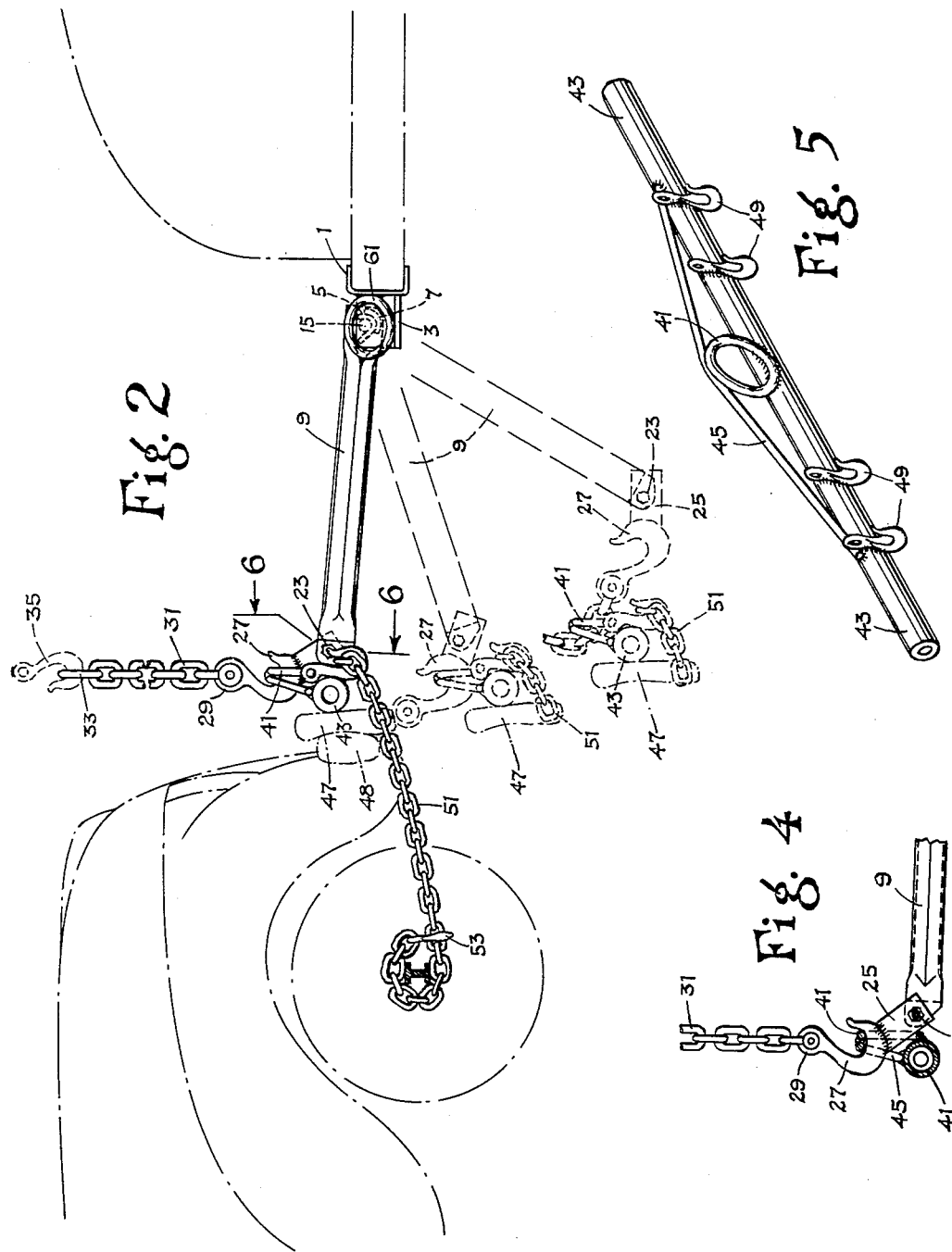

July 12, 1955
M. M. WILEY
2,712,877
AUTOMATICALLY COUPLING WRECKING
TRUCK TOWING ATTACHMENT
Filed April 30, 1952
3 Sheets-Sheet 3
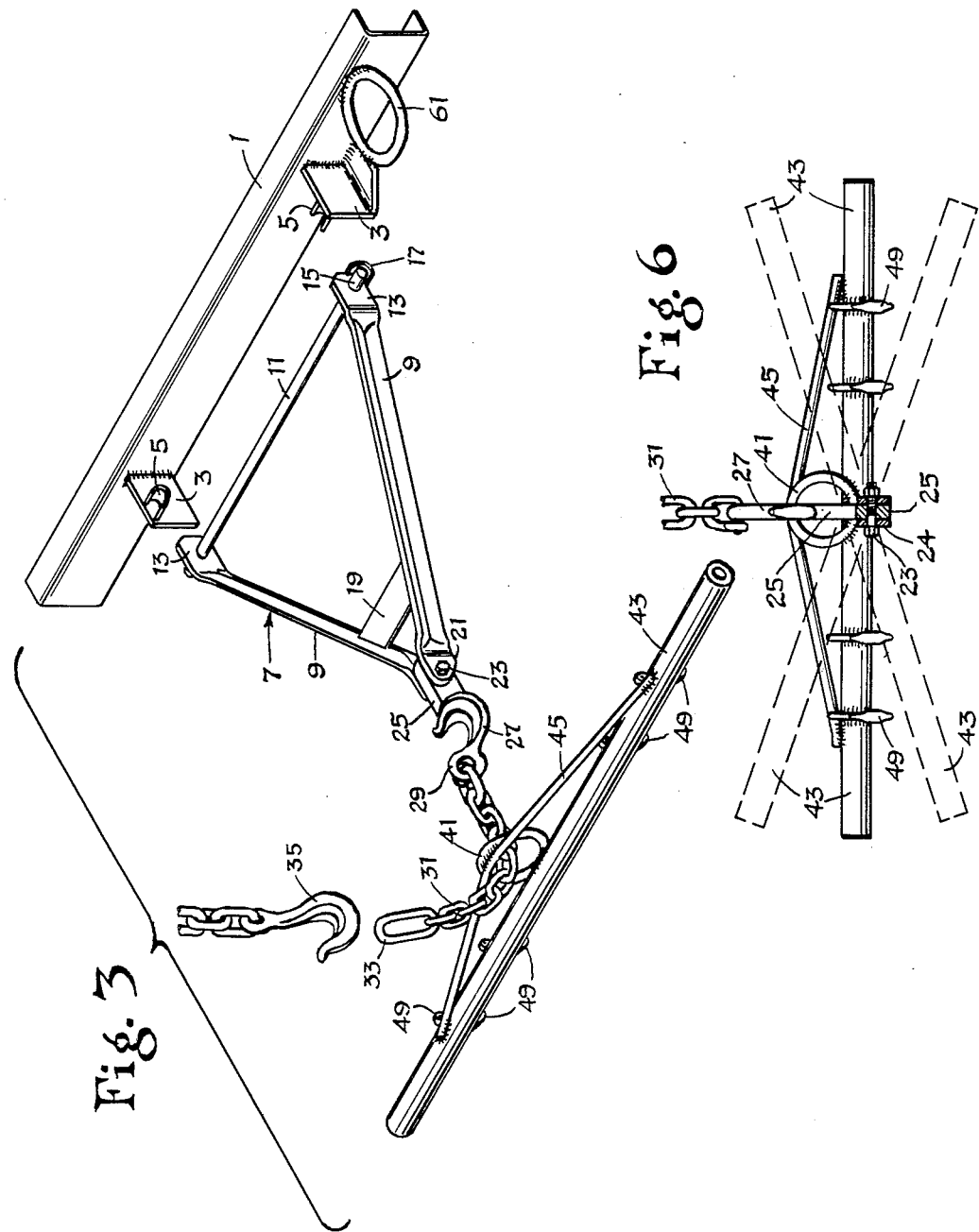
INVENTOR:
Mike M. Wiley
BY
*Ralph F. Staubly*
ATTORNEY.

United States Patent Office 2,712,877
Patented July 12, 1955

2,712,877

AUTOMATICALLY COUPLING WRECKING TRUCK TOWING ATTACHMENT

Mike M. Wiley, Nashville, Tenn.

Application April 30, 1952, Serial No. 285,102

7 Claims. (Cl. 214—86)

This invention relates to an automatically coupling towing attachment, which is designed for the towing of trucks or passenger automobiles.

Towing devices of the prior art have generally either (1) been very unsteady and dangerous (as when the end of a towed vehicle is suspended from the rearwardly extending boom of a tow-truck crane) or (2) been expensive, cumbersome and difficult to operate (as where an end of a towed car is lifted by one or more arms extending from the truck and beneath the car).

This invention contemplates providing a towing attachment which is simple in design and operation, light in weight, yet inexpensive in manufacture and upkeep.

Accordingly it is an object of this invention to provide a towing attachment which is highly effective yet inexpensive.

It is another object to produce a towing attachment having a small number of parts, but which parts are separable for ease in using, storing or other handling.

It is a further object of this invention to provide a towing attachment which is easy to attach to both the truck and the car and without requiring careful alinement and/or spacing of the two vehicles.

It is a still further object to provide a towing attachment which rigidly holds the towed vehicle against both lateral and longitudinal swaying while at the same time providing a universal-joint type of coupling between the two vehicles.

It is still another object to produce a towing attachment in which ample working space can be left between the vehicles during "make-up," and in which a continuous pull by the crane cable will effect (1) a drawing together of the vehicles, (2) an automatic coupling of a universal-joint-like connector, and (3) a simultaneous lifting of the connector and the attached end of the towed vehicle.

In the drawings:

Fig. 1 is a plan view of a preferred embodiment of the invention.

Fig. 2 is an elevational view of the showing of Fig. 1.

Fig. 3 is an exploded perspective view of the device of Figs. 1 and 2.

Fig. 4 is a fragmentary elevational view in section taken on the line 4—4 of Fig. 1.

Fig. 5 is a perspective view of the bumper-attachable coupling device.

Fig. 6 is an elevational view of the showing of Figs. 1–3 in section taken on the line 6—6 of Fig. 2.

Fig. 7 is a fragmentary perspective view of a modified form of bearing or socket for the towing member.

With reference now to the drawings, the numeral 1 designates a channel bar for attachment to the rear of a towing truck, by any suitable means, such as bolts or welding. The bar 1 has rigidly attached thereto, as by welding, rearwardly extending vertically oriented plates 3. To the inner faces of the plates 3 are welded J-shaped bearing members 5, the longer leg of which is upwardly and rearwardly inclined, for a purpose hereinafter to be described. Detachably mountable on the bar 1 by insertion into the bearing members 5 is a towing member generally designated as 7. The towing member 7 is preferably constructed as a triangular frame, consisting of two lateral bars 9 (of V-shaped cross-section for strength) joined by a base rod 11, which extends through openings at the forward extremities 13 of the bars 9 and is welded thereto. The extensions 15 of the rod 11 constitute trunnions for snug reception into the trough-shaped bearing members 5. Below and forwardly of each trunnion 15 is a section of a cylinder 17 welded to the extension 13 in such position as to underlie each bearing member 5 when the towing member is in operative position, so as to prevent accidental displacement of the trunnions 15 from the bearing members 5. Due to the short arc subtended by the members 17, they do not interfere with placement or removal of the trunnion members 15, since they are effective only in the generally horizontal position of the towing member 7. A cross brace or web 19 may be employed to strengthen the frame member 7. The rear end of towing member 7 is formed as a horizontal-axis hinge portion by having the rear ends 21 of the bars 9 held parallel and slightly spaced by said web 19 and by a pin 23 extending horizontally through openings in said ends 21. Snugly received between said ends 21 and pivotal about pin 23 is a post member 25 which may be a short metallic bar of rectangular cross-section. To the free end of post member 25 is welded the bottom of a hook 27 in such manner as to point the lip of said hook 27 forwardly and upwardly when said post member 25 is swung to vertical position. The upper end of hook 27 preferably is formed as an eye for attachment thereto of a link chain 31 of any desired length. Link chain 31 terminates preferably in an enlarged link 33 for mating reception of a conventional hoist-cable hook 35.

The chain 31 is adapted to be passed through a loop means, such as ring 41, to effect coupling of the tow member 7 to the vehicle to be towed. As the hoist cable pulls the chain 31 upwardly, the ring 41 is caused to slide downwardly over said chain to come to rest in the throat of the hook 27.

A highly satisfactory apparatus for connecting the ring member 41 to the vehicle to be towed, is a metallic bar 43, which may conveniently be a piece of tubing to the center of which the ring 41 may be welded as shown. A bent brace-rod 45 may be added, as shown, to further strengthen the attachment of the ring 41 to the bar 43. Bar 43 is adapted to lie along the front or rear bumper of an automobile, and preferably lies against the central portions of the bumper guards 47 thereof (Fig. 2). Symmetrically and laterally spaced along the face of bar 43 are a plurality of hooks 49 welded thereto, with their hooks upwardly and forwardly open.

To attach bar 43 to the towed vehicle, two or more tie-chains 51 (Figs. 1 and 2) are employed. Each tie-chain 51 terminates at one end in a hook 53 similar to hooks 49, by which the chain 51 may be connected to itself after being wrapped around some rigid understructure of the towed vehicle as shown in Fig. 2. After connection to said understructure of the towed vehicle each chain 51 is passed forwardly under the bumper and is dropped into one of the hooks 49 at such a position along said chain 51 as will cause the bar to rest against the center of the bumper guard 47 (or along the center line of the bumper, if there are no guards) when the chain 51 is pulled taut.

For safety and to comply with the law in some states, an auxiliary tie-loop or ring 61 (Figs. 1 and 3) may be welded at any convenient point on the channel bar 1, to permit the use of a second or "safety" tie chain.

In Fig. 7 is shown an alternative construction of the bearing member. In this modification a plate 71 is bolted or welded, either directly to the tow-truck body or to a channel bar similar to the bar 1 previously described. The bearing member 73 is formed by bending a metallic strip to form a deep U-shaped trough, which is welded at one of its ends to the plate 71. Then through the arms of the U-shaped bearing member 73, is inserted a split pin 75, which passes through alinged openings in the bearing member to prevent upward displacement of the trunnions therefrom. Loss of the pin 75 may be prevented by a chain 77 or the like. The pin 75 has a pointed end to facilitate its insertion into trunnion-retaining position and to assist in compressing it into cylindrical form from its slightly spiral normal condition, which produces a frictional retension of said pin in the openings in bearing member 73.

The bar 1 and the parts rigidly attached thereto are intended for more or less permanent mounting on the rear of a tow truck. The towing member 7 and the hook and and hoist chain attached thereto are normally carried loosely in the truck, along with connection bar 43 and tie chains 51. When it is desired to effect a towing connection with a disabled vehicle, the tow truck is backed roughly in line with the disabled vehicle and to a distance of about four feet therefrom, which allows ample space for the service man to work. The chains 51 are now fastened under the automobile as shown in Fig. 2 and are laid forwardly along the ground underlying the bumper. Bar 43 is then manually held in the position of Fig. 2 and each tie chain is pulled taut and dropped into one of the hooks 49. The bar 43 may now be laid on the ground in front of and parallel to the bumper.

Next tow member 7 is held vertically so that retainer members 17 will not interfere with insertion of trunnions 15 into bearing members 5, and is dropped into operative connection with said bearing members 5. Link 33 of chain 31 is then threaded upwardly through ring 41 on bar 43, as shown in Fig. 3. Hook 35 of the hoist-cable (not shown) is now inserted into link 33. As the hoist cable is wound onto a conventional winch reel, chain 31 will be pulled through ring 41, first, to lift bar 43 into bumper-engaging position, next, to draw the automobile, along with hook 27 and the rear free end of towing member 7, into the towing position shown in Fig. 2.

While I have disclosed a preferred embodiment of the invention, it is to be understood that many changes can be made in the size, shape, composition, and arrangements of the various parts without departing from the spirit of the invention as defined by the subjoined claims.

Having thus described my invention, what I claim as new and desire to secure by Letters Patent of the United States is:

1. A towing device, comprising: a relatively rigid towing member for holding the lifted end of a towed vehicle at a desired distance behind a tow-truck; mounting means for said towing member adapted for firm attachment to rear structure of a tow-truck; co-acting journal and bearing means pivotally connecting the forward end of said towing member to said mounting means for rotation about a substantially horizontal axis; an elongated flexible hoist member having means at its upper end for quickly detachable connection with a crane cable; means connecting said flexible hoist member to said towing member near the rear end of the latter; a coupling device adapted for attachment to an end of a vehicle to be towed, said coupling device including a loop means having a relatively smooth, rounded, low-friction inner surface and thru which said flexible hoist member can be passed and pulled; whereby the vehicle to be towed may be drawn toward the tow truck by the sliding of said flexible hoist member thru said loop means until said coupling device engages said towing member, and then be lifted by said coupling device along with the rear end of said towing member to a desired towing height.

2. A towing device according to claim 1 and in which said towing member comprises a generally triangular frame the rear end of which is an apex thereof.

3. A towing device according to claim 1 and in which said journal and bearing means comprise bearings, trunnions receivable in said bearings, said trunnions and bearings being removably separable in only certain relative positions of rotation thereof, and safety stop means for preventing separation of said bearings and trunnions in at least the normal use relative positions thereof.

4. A towing device according to claim 1 and in which said means connecting said flexible hoist member to said towing member comprises a post pivotally connected to the rear end of said towing member by a horizontally and transversely disposed axle, and swingable into substantially vertical position by the pull of said hoist member to matingly enter the loop means of said coupling device, whereby said loop may rotationally oscillate about said post during a towing operation.

5. A towing device according to claim 4 and in which said post includes seat means upon which said loop means may rock and pivot both horizontally and vertically.

6. A towing device sub-combination comprising: a rigid coupler bar for lying along the bumper structure of a vehicle to be towed; loop means having a relatively smooth, rounded, low-friction inner surface and fastened to said bar centrally thereof for quick slip-thru connection with a flexible lifting and towing device; and a plurality of hook means fastened to said bar laterally of said loop means for receiving tie-chains connectable to the under structure of said vehicle.

7. A towing device according to claim 6 and additionally comprising a plurality of tie chains having self-engaging hooks on one end of each thereof, whereby said end may be looped around an axle or other substantial structure and be hooked onto itself and whereby said tie chains may then be passed under said bumper for hooking attachment to the hooks of said bar.

References Cited in the file of this patent

UNITED STATES PATENTS

| | | |
|---|---|---|
| 1,254,804 | Holmes | Jan. 29, 1918 |
| 1,517,547 | Ekberg | Dec. 2, 1924 |
| 1,520,194 | Mathews | Dec. 23, 1924 |
| 1,794,148 | Collins | Feb. 24, 1931 |
| 2,210,907 | Erickson | Aug. 13, 1940 |
| 2,378,504 | Roos | June 19, 1945 |
| 2,497,379 | Vandergrift Sr. et al. | Feb. 14, 1950 |
| 2,512,635 | Flowers | June 27, 1950 |
| 2,555,663 | Sehouboe | June 5, 1951 |

FOREIGN PATENTS

| | | |
|---|---|---|
| 385,467 | Great Britain | Dec. 29, 1932 |